United States Patent [19]

Kato et al.

[11] 4,417,705
[45] Nov. 29, 1983

[54] TAPE CASSETTE

[75] Inventors: Toshikazu Kato, Hino; Sinichi Saitou, Hachioji, both of Japan

[73] Assignee: Olympus Optical Co., Ltd., Tokyo, Japan

[21] Appl. No.: 266,936

[22] Filed: May 26, 1981

[30] Foreign Application Priority Data

May 30, 1980 [JP] Japan ................................. 55-73821

[51] Int. Cl.³ .............................................. G11B 15/32
[52] U.S. Cl. .................................................. 242/199
[58] Field of Search ................ 242/199, 55.19 A, 200; 360/96.5; D14/11; 226/118

[56] References Cited

U.S. PATENT DOCUMENTS

| 3,642,229 | 2/1972 | Downey et al. | 242/199 |
| 3,995,790 | 12/1976 | Kelch et al. | 242/199 |
| 4,131,243 | 12/1978 | Machida | 242/199 |

Primary Examiner—John M. Jillions
Attorney, Agent, or Firm—Frishauf, Holtz, Goodman and Woodward

[57] ABSTRACT

A tape cassette is provided with a pair of guide rollers for limiting the position of travel in the vertical direction. Holes which serve to determine the position of the tape cassette and into which cassette guides arranged on a chassis of tape recorder can be inserted are formed, respectively, under their corresponding guide rollers. The horizontal distance between the position determining hole and the corresponding guide roller is reduced to a minimum.

7 Claims, 4 Drawing Figures

TAPE CASSETTE

BACKGROUND OF THE INVENTION

This invention relates to a tape cassette in which a magnetic tape is housed.

In the case of a tape cassette in which a magnetic tape is housed, the position of tape cassette relative to the tape recorder body is determined by a plurality of cassette guides arranged in the tape recorder body. In addition, the position of a running tape is limited in the vertical direction by a pair of guide rollers arranged in the tape cassette. Cassette guides for determining the position of the tape cassette are arranged in the tape recorder body while guide rollers for limiting the position of the running tape in the vertical direction are arranged in the tape cassette. The cassette guides are positioned apart from the guide rollers in the horizontal direction.

The stability of tape running is important in order to achieve accurate recording and reproducing operations. However, the well-known type of tape cassette comprising cassette halves made of plastic material causes tape positional errors because of inherent deformation of the cassette halves, and these errors can not be neglected. There exists a tape cassette comprising cassette halves made of die-cast aluminum which is designed to avoid the deformation of the cassette halves which normally hinders the stability of tape travel in plastic cassettes. However, this type cassette of die-cast aluminum is expensive to produce in a small size.

SUMMARY OF THE INVENTION

It is therefore an object of the invention to provide a tape cassette made of plastic material and which is capable of assuring stable tape travel.

The invention originates from the fact that cassette guides are spaced to some extent in the horizontal direction from guide rollers in the well-known type of tape cassette so that the deformation of cassette halves made of plactic material causes the guide rollers to be slanted relative to a reference face, and thus hinders the stability of tape travel. According to the invention, holes which serve to determine the position of the tape cassette and into which cassette guides can be inserted are formed under the guide rollers.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention.

DETAILED DESCRIPTION OF THE PREFERRED EMBODIMENT

Figure 1:
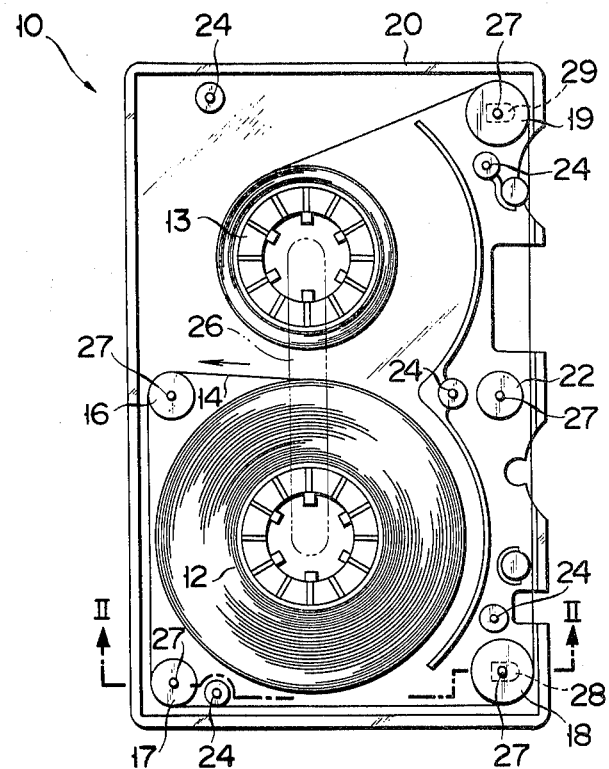
FIG. 1 is a plan view showing a tape cassette according to the invention with its upper half removed.
Figure 2:
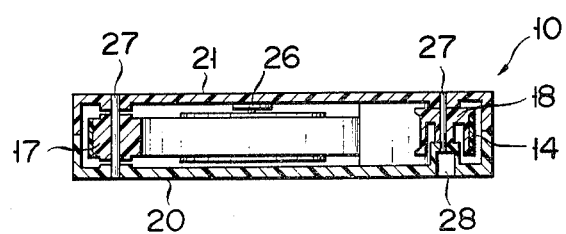
FIG. 2 is a sectional view taken on line II—II in FIG. 1 with the upper half attached.

FIG. 1 shows a tape cassette 10 according to the invention from which its upper half is removed and in which a magnetic tape 14 is wound around a pair of reel hubs 12 and 13. The magnetic tape 14 is fed from the reel hub 12, which is arranged on the supply side, to the reel hub 13, which is arranged on the take-up side, via guide rollers 16, 17, 18 and 19. Reference numeral 20 denotes a lower half of the tape cassette 10; 22 an impedance roller; 24 a plurality of bosses for attaching the upper half 21 (see FIG. 2) to the lower half 20; and 26 a reel pressing spring. Reference numeral 27 represents roller shafts for guide rollers, of which those for guide rollers 16 and 17 are fixed to the cassette halves while the others are rotatably held.

Figure 3:
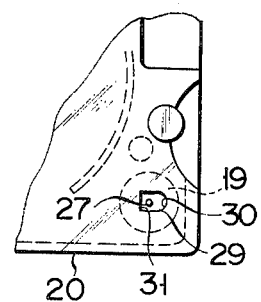
FIG. 3 is a partial bottom view of the lower half of the tape cassette showing a hole which serves to determine the position of tape cassette.

Guide rollers 18 and 19 arranged on the front side of the tape cassette are different in shape from guide rollers 16 and 17 arranged on the back side thereof. As is apparent from FIG. 2, guide rollers 18 and 19 are formed to have flanges so that they may serve as guide rollers for limiting the position of the running tape in the vertical direction. Holes or depression 28 and 29 for determining the position of the tape cassette are formed in the lower half 20 directly under guide rollers 18 and 19, respectively. As shown in FIG. 3, each of holes 28 and 29 is formed to have an arched end 30 on the front side of the tape cassette (FIG. 3 shows the hole 29 only).

Figure 4:
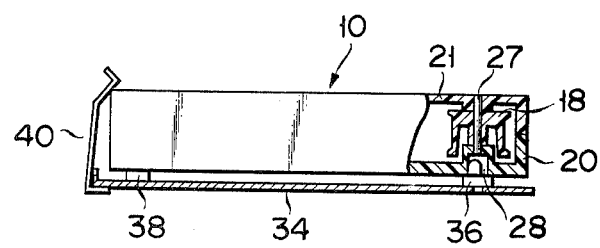
FIG. 4 is a partially broken side view showing the tape cassette mounted in a predetermined position in a tape recorder body.

When mounted to the tape recorder, the tape cassette 10 constructed as described above is held in position, as shown in FIG. 4, by a pair of cassette guides 36, a cassette receiver 38 and a cassette pressing spring 40 arranged on a chassis 34 of a tape recorder. The tape cassette is limited in the vertical direction by the upper face of the cassette receiver 38 and stepped faces of cassette guides 36, and is limited in the horizontal direction by ends 31 (see FIG. 3) of the holes 28 and 29 pressing against cassette guides 36 by the urging force of the cassette pressing spring 40. As described above, position determining holes 28 and 29 are formed adjacent to and beneath guide rollers 18 and 19 to thereby limit the position of the tape cassette in the horizontal direction. Therefore, even if the cassette halves are deformed the, guide rollers can be held in position so as not to slant, but to remain perpendicular to the reference face of the cassette receiver 38, thus allowing accurate and stable tape travel to be attained and the changing of tape cassettes to be accurately achieved.

According to the invention, position determining holes into which cassette guides are inserted are formed, respectively, under the guide rollers which serve to limit the position of the tape travel in the vertical direction. This allows the horizontal distance between the guide roller and its corresponding position determining hole to be made minimum, so that tape travel errors due to the deformation of cassette halves can be made almost negligible. Therefore, if the cassette halves are made of plastic material, the stability of tape travel can be sufficiently assured to effect accurate recording and reproducing operations. If position determining holes are formed, as apparent illustrated embodiment of the invention, directly under the guide rollers so as to make zero the horizontal distance therebetween, due to error because deformation of cassette halves can be made negligible.

The technical concept of the invention can be applied to tape cassettes for video tape recorders as well as for audio tape recorders. The tape cassette employed in the embodiment of the invention is intended for use effectively on only one face, for example the a face, of the tape. However, in the case of a tape cassette intended use for on both faces A and B of the tape, position determining holes may be formed above and beneath each of the guide rollers. Position determining holes are always positioned under the guide rollers in any case when the tape cassette is used.

What we claim is:

1. In a tape cassette having a front side adapted to confront a tape head of a tape recorder and a rear side remote from said tape head, comprising:

a pair of cassette halves defining a tape receiving chamber therebetween;

a pair of reel hubs mounted between said cassette halves;

a magnetic tape wound on said reel hubs and adapted to be fed from one of said reel hubs to the other; and guide roller means mounted between said cassette halves for guiding the travel of said magnetic tape between said reel hubs, said guide roller means including a pair of front guide rollers arranged on the front side of said tape cassette, said front guide rollers each having a rotation axis substantially perpendicular to said cassette halves and having flanges thereon for engaging the tape to limit the position of the tape travel in the vertical direction of the cassette;

the improvement comprising:

a pair of position determining holes formed in at least one of said cassette halves to determine the position of said tape cassette relative to a chassis of a tape recorder, said pair of position determining holes each having a right circular cylindrical inner peripheral guiding surface portion and each of said position determining holes being formed under a respective associated front guide roller such that an extension of the rotation axis of said front guide rollers passes through its respective determining hole which is located therebeneath;

said right circular cylindrical inner peripheral guiding surface portion being adapted to engage in surface-to-surface contact with a right circular cylindrical outer surface portion of a guide pin of the tape recorder.

2. The tape cassette of claim 1, wherein each of said position determining holes is generally in a rectangular shape, one side of said generally rectangular shape on the front side of said tape cassette being defined by said right circular cylindrical inner peripheral guiding surface portion.

3. The tape cassette of claim 1, wherein said position determining holes comprise depressions formed in said at least one of said cassette halves.

4. The tape cassette of claim 3, wherein each of said position determining depressions is generally in a rectangular shape, one side of said generally rectangular shape on the front side of said tape cassette being defined by said right circular cylindrical inner peripheral guiding surface portion.

5. The tape cassette of claim 1, for use with a tape recorder having cassette guides projecting from a cassette receiving surface thereof, said positioning determining holes being adapted to receive at least a portion of a respective circular cassette guide therein for limiting the position of said cassette in the horizontal direction of said cassette.

6. The tape cassette of claim 1, comprising at least two front guide rollers arranged on respective ends of the front side of said tape cassette, and a corresponding pair of position determining holes formed directly beneath each respective front guide roller.

7. The tape cassette of claim 3, comprising at least two front guide rollers arranged on respective ends of the front side of said tape cassette, and a corresponding pair of position determining holes formed directly beneath each respective front guide roller.

* * * * *

UNITED STATES PATENT AND TRADEMARK OFFICE
CERTIFICATE OF CORRECTION

PATENT NO. : 4,417,705
DATED : November 29, 1983
INVENTOR(S) : Toshikazu KATO, et al It is certified that error appears in the above-identified patent and that said Letters Patent is hereby corrected as shown below:

In the Abstract:

line 2, after "limiting the position of" insert --tape--;

Column 2, line 24, after "Holes or" change "depression" to
--depressions--;

line 45, after "deformed" change "the," to --, the--;

lines 64 and 65, change "due to error because deformation" to
--error due to deformation--;

Column 3, line 3, after "for example" change "the a face" to
--the A face--;

line 5, change "use for on" to --for use on--.

Signed and Sealed this

Eighth Day of May 1984

[SEAL]

Attest:

GERALD J. MOSSINGHOFF

Attesting Officer    Commissioner of Patents and Trademarks